United States Patent Office 3,403,466
Patented Oct. 1, 1968

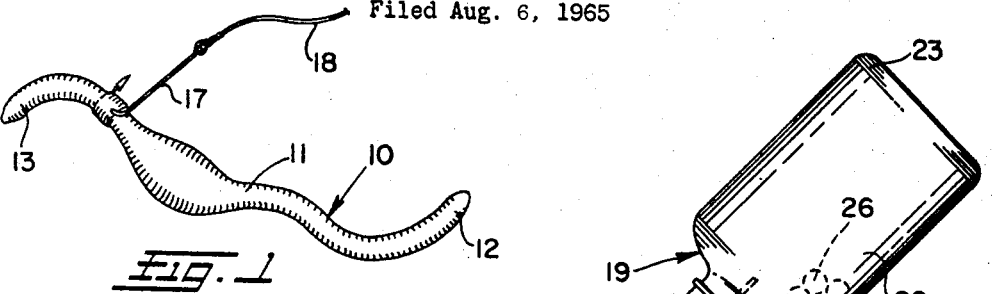
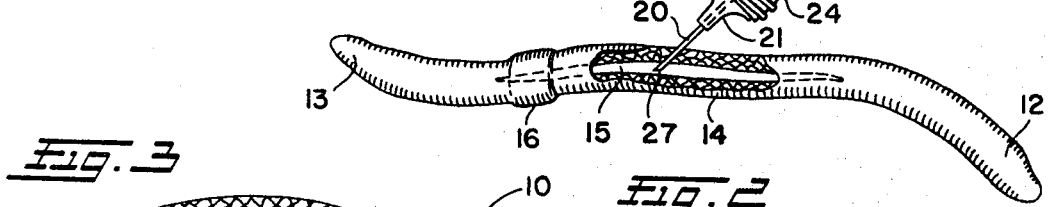
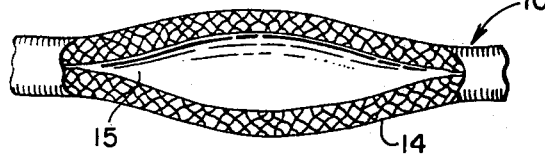
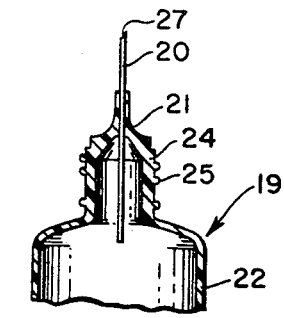
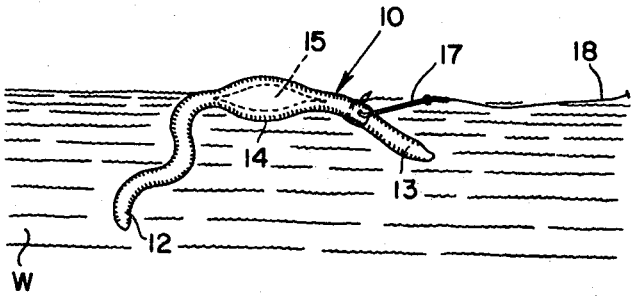
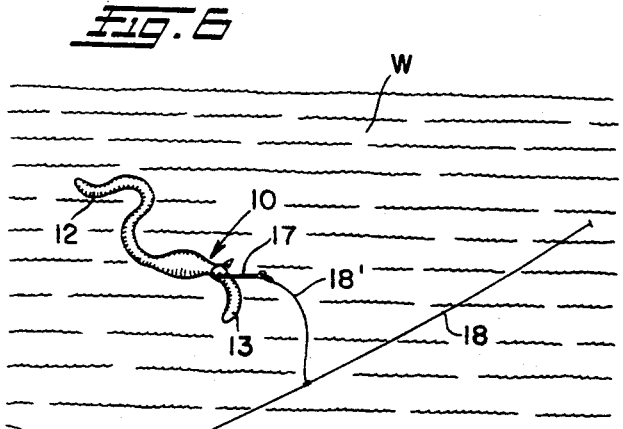

3,403,466
ARTICLE FOR INJECTING FISH-ATTRACTANT INTO LIVE BAIT
Arthur C. Young, 85 Front St., Berea, Ohio 44017
Filed Aug. 6, 1965, Ser. No. 477,791
2 Claims. (Cl. 43—4)

ABSTRACT OF THE DISCLOSURE

A plastic squeeze bottle provided with a hypodermic needle and containing a fish-attractive agent at least partially in the vapor phase for injection into the internal tract of an angleworm to inflate, buoy, and enhance the fishing lure effectiveness of the latter.

---

By virtue of its natural presentation, live fishing bait is normally the most desirable and possibly the most effective lure for catching fish. Although the type of live bait of course depends on the type and habitat of particular fish and the type of water, a very common type of live bait used for catching pan fish and the like is the ordinary earthworm, or angleworm or nightcrawler, as it is more commonly referred to.

The use of live bait in the form of angleworms presents some problem owing to the weight of the worm. The specific gravity of the worm is greater than water and accordingly the worm tends to sink in the water unless additional float equipment is employed for positioning the live bait at the surface of the water. The use of such float equipment to surface position the live bait is undesirable in that it not only increases cost and inconvenience but additionally tends greatly to detract from the natural presentation of the live bait to the fish.

Moreover, fishing for certain types of fish requires the live bait to be positioned relatively near the bottom of the lake or body of water owing to the particular swimming habits of the fish concerned. Again, the specific gravity of the live worm creates a difficulty in that the worm tends to sink entirely to the bottom, which is undesirable due to the normally soft condition of the bottom and the resulting tendency to partially or completely obscure the bait. Accordingly, before the present invention, float equipment was similarly required, with the attendant noted disadvantages, to properly position the worm at an approximate height above the bottom of the lake or like body of water.

With the above in mind, it is a primary object of the present invention to provide a novel fishing lure and method of preparing the same which essentially comprises the treating of live bait to render the specific gravity thereof less than water so that the bait will naturally float on the water surface, or at a predetermined water depth in the event sinker or like means are attached to the fishing line.

A further object of the present invention is to provide a live bait which can be thus treated without significantly affecting the natural presentation or appearance of the bait to the fish. More specifically, in accordance with the present invention, the live bait, an angleworm being illustrated in the application drawing, is inflated with a suitable fluid, such as air, with the resulting inflation to render the worm floatable not significantly affecting the appearance thereof so as to reduce or impair the attraction of the fish thereto.

These and other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

FIG. 1 is a perspective view of a worm which has been treated as above described and through which a fishing hook has penetrated;

FIG. 2 is a side elevational view of the worm, slightly enlarged, with the worm being partially sectioned to show the internal tract communicating with a hypodermic-type needle through which a fluid, such as air, can be introduced to such tract for expanding the same;

FIG. 3 is a fragmentary, further enlarged sectional view through such internal tract, with the same being shown in its inflated condition;

FIG. 4 illustrates the manner in which the thus treated worm floats on the surface of the water;

FIG. 5 shows the manner in which the treated worm can be positioned relatively near but above the bottom without the need for additional floating equipment, and FIG. 6 is a vertical sectional view showing a preferred means for supplying air to the internal tract of the worm.

Referring now in more detail to the drawing, where like parts have been indicated by like reference numerals, the worm is generally indicated at 10 and comprises a generally cylindrical body 11 having tapered end portions 12 and 13. The worm 10 has a digestive tract extending completely axially therethrough, with such tract being relatively enlarged in the intermediate portion 14 of the body, with such enlarged internal tract being indicated at 15. The worm 10 has a relatively hard or rigid section 16 which is better adapted to firmly secure and retain a fishing hook 17 connected in the usual manner to a fishing line 18. The detailed physiology of the worm 10 is not thought essential to a full understanding of the present invention and accordingly will not be described in any further detail.

Fluid can be admitted to the internal tract 15 of the worm by any suitable means. However, the preferred means for inflating the tract 15 comprises a preferably plastic bottle generally indicated at 19. A hypodermic type needle 20 extends in sealed relation into the interior of the plastic bottle through a tapered outer neck portion 21 thereof. The bottle 19 can be made from any suitable plastic, for example, polyethylene, with main wall 22 of the bottle being flexible to permit squeezing of the same for expulsion of the fluid therefrom. For purposes of convenience and cost, the bottle 19 simply contains air, although it will be apparent that any other suitable fluid, including liquids have a relatively low specific gravity, can be employed to provide the desired floating characteristics.

The bottle 19, shown in section in FIG. 6, further includes relatively rigid bottom and top sections 23 and 24, respectively. The latter is in the form shown externally threaded as indicated at 25 for receiving a suitable cover (not shown) for enclosing the hypodermic type needle 20 for permitting safe handling of the bottle 19.

As a further lure feature, a plurality of pellets 26, shown in dotted lines in FIG. 2, are disposed within the bottle 19, which pellets are coated with an aromatic coating which is effectively absorbed by the air within the bottle and delivered to the tract 15. Such coating may comprise a solution of 50 percent denatured alcohol, 45 percent anise oil and 5 percent asafetida. The coating may be applied by soaking the plastic pellets in the solution, after which the alcohol evaporates leaving an oil coating on the pellets. The use of aromatic characteristics per se with live or artificial bait is not novel, but the use of the bottle-enclosed pellets for such purpose, in accordance with the present invention, is believed to provide a novel combination for realizing such further attraction.

The manner in which the worm 10 can be inflated should be apparent from the above description. The hypodermic type needle 20 is pushed through the intermediate section 14 of the body 11 of the worm until the leading end 27 of the needle communicates with the internal tract 15. To facilitate penetration of the needle, the leading end thereof is preferably beveled as shown. The flexible wall 22 of the bottle is then squeezed so as to reduce the volume of the bottle and force air outwardly thereof through the needle 20 into the internal tract 15. The amount of air expelled from the bottle can of course be regulated by the degree of squeezing of the same. With squeezing pressure still applied to the bottle, the needle can be then withdrawn through the body of the worm, with the body composition of the worm being such as to naturally seal any opening thus formed by the previous penetration of the needle 20 through the body wall. It will be apparent that each worm can be inflated just prior to use, or that a number of such worms can be conveniently simultaneously inflated. The hook 17 can be applied before or after the inflating process as desired.

For use as surface bait, as shown in FIG. 4, only the hook 17 and the impaled worm 10 are attached to the fishing line 18 whereby the worm, by virtue of the inflated internal tract 15, floas on the surface of the water. Where it is desired to position the worm bait slightly above the bottom B of the body of water W, a weight 28 is attached to the fishing line 18, as shown in FIG. 5, with a branch line 18' carrying the fishhook 17. The inflated worm 10 will tend to rise in the water W and the position thereof above the bottom B can be regulated by varying the length of the branch line 18' and the point of connection thereof with the main line 18.

It should be noted that tests have shown that the inflating of the worm does not appear to adversely affect the worm in the use thereof as bait. As a matter of fact, the animation of the worm following inflation is noticeably increased, particularly in the inflated intermediate section, with such increased animation being effective to enhance the fish-inducing characteristics of the worm.

It will accordingly be seen that the present invention is novel in many respects. The unique inflation of the worm distinctly alters the same to the extent that the specific gravity of the worm is less than that of water. The inflated worm can thus float on the surface without requiring separate float equipment, and can be vertically positioned in the water below the surface with only a sinker or the like. The worm simultaneously maintains its natural presentation and, in fact, the luring characteristics of the worm are actually improved following inflation. The means illustrated for realizing such inflation is inexpensive and simply operable, and as disclosed, includes means for aromatic treatment of the air supplied to the internal tract of the worm to even further enhance the use of the worm as bait.

I therefore particularly point out and distinctly claim as my invention.

1. An article of manufacture comprising a plastic squeeze bottle having a hypodermic needle in communication with the interior thereof, and a fish-attractive agent within said bottle at least partially absorbed by the air therewithin, whereby upon squeezing said bottle air carrying said agent may be injected into an angleworm to inflate and flavor the latter.

2. An article of manufacture comprising a plastic squeeze bottle having a relatively rigid top section exteriorly threaded for receiving a cover or the like, a hypodermic needle extending through said top section in sealed relation therewith exteriorly of the bottle and communicating with the main interior portion of said bottle, and a fish-attractive agent in said bottle comprising a plurality of pellets coated with a fish-attractive aromatic substance absorbable by the air within the bottle for transfer therewith into the internal tract of an angleworm.

References Cited

UNITED STATES PATENTS

| 2,798,488 | 7/1957 | Hall | 128—232 |
| 2,957,501 | 10/1960 | Holmes | 128—272 X |
| 2,769,444 | 11/1956 | Henderson | 128—216 |

FOREIGN PATENTS 1,150,413  8/1957  France.

SAMUEL KOREN, *Primary Examiner.*

D. J. LEACH, *Assistant Examiner.*